United States Patent Office 3,251,785
Patented May 17, 1966

3,251,785
FLAME-RETARDANT POLYURETHANE FOAM
AND METHOD FOR FORMING SAME
James J. Anderson, Richmond, Va., assignor to Socony
Mobil Oil Company, Inc., a corporation of New York
No Drawing. Filed Feb. 14, 1961, Ser. No. 89,134
17 Claims. (Cl. 260—2.5)

This invention relates to flame-retardant urethane foams and a process for making such urethane foams, and, more particularly, to a flame-retardant urethane foam which, when subjected to a flame, forms a uniform, non-burning charcoat on the surface thereof.

Urethane polymers and processes for their transformation into foamed rigid or flexible materials are well known. These polymers are formed by the reaction of a compound containing at least two active hydrogen atoms per molecule and a polyisocyanate, usually a diisocyanate of the aromatic type. Such active hydrogen compounds include polyester and polyether polyols.

In making a cellular foamed product, a polyol is reacted with a polyisocyanate in a system containing 5–48% NCO groups and sufficient water to react with the excess NCO groups. The water-NCO reaction liberates $CO_2$, leading to a foamed product. Another method for forming the cellular structure is by using a low-boiling, inert liquid which is added to the polyol-isocyanate mixture at substantially the same time as the catalyst therefor. As the reaction proceeds, heat is generated and the low-boiling, inert liquid is vaporized. This vapor is trapped in the viscous mass, thus leading to the foaming action. Other methods of preparing the foamed urethane polymers are also known in the art.

Among the conventional polyols now being used in the manufacture of polyurethane foams are the reaction products of polybasic acids such as adipic, phthalic, sebacic, succinic, oxalic, ricinoleic, and the like with a polyhydric alcohol, such as one of the glycols, glycerol, trimethylol propane and the like. Polyalkylene ether glycols have also been used.

A principal disadvantage and thus a factor which limits the potential uses of the foamed products manufactured from polyurethanes is that they may be easily ignited and burned. In the initial stages of urethane foam development, polyesters were more frequently used in the preparation of the foamed products. Much technology has evolved dealing with flame retarding foams made with the conventional polyester polyols by incorporating phosphorus compounds therein.

From the evolution of the technology of flame retarding polyurethane foams have come certain criteria for judging their superior or inferior performance. In many cases, the criteria amount to demands. As an example, users demand, because of the codes which govern foam use in a particular field, that their foams burn without dripping. One reason is that, while flame-retardant urethane foams may be self-extinguishing after the flame is removed, as long as a flame is in contact with the foam, burning droplets of melted foam will fall which may start other, smaller fires as they drop to the surrounding areas.

Foams made from polyester polyols, when made flame-retardant with, for example, phosphorus compounds, form charcoats when they burn. Consequently, dripping is not a problem. However, with the advent of the cheaper polyether polyols, a serious problem confronts formulators and end users because all urethane foams made from polyethers currently produced will drip when they contain sufficient phosphorus to significantly make them flame-retardant.

One of the reasons why polyester-based foams do not drip when they are in contact with a flame is that normally less phosphorus is required to impart flame-retardant properties thereto. On the other hand, conventional polyether-based foams are more flammable and require significantly more phosphorus to reach the point where they are usefully flame-retardant. Consequently, by the time the proper concentration of phosphorus has been added, the point where dripping can occur has been reached and passed.

In spite of the fact that polyether-based foams drip when they are usefully flame-retardant, manufacturers, formulators, and end users continue to encourage their production and use. One reason is the lower cost. Another is their relative ease of manufacture. These two reasons alone are enough to cause a concentrated effort by the industry to find ways to make non-dripping polyether-based foams which are flame-retardant and which will charcoat in the same manner as the polyester-based foams when in contact with a flame. Still another reason which has given impetus to a solution of this problem is that many areas where non-dripping foams only can be used, such as transportation, particularly airline, appliance and construction industries, are presently unavailable to the formulators of polyether-based foams.

Accordingly, it is an object of this invention to obviate the disadvantages presently existing with respect to polyether-based urethane foams.

Another object of this invention is to provide a flame-retardant polyether-based polyurethane foam which will form a non-burning charcoat on its surface when in contact with a flame, instead of melting and dripping.

Still another object of this invention is to provide a process for forming a flame-retardant polyether-based polyurethane foam which will not melt and drip when in contact with a flame but which will merely form a uniform, non-burning charcoat on its surface.

In attaining the objects of this invention, one feature resides in forming the urethane foam by the reaction of an isocyanate with a polyol which is an alkoxylated disaccharide having an average of from one to two alkoxides reacted per hydroxyl.

Another feature resides in the particular proportioning of certain phosphorus compounds with the alkoxylated disaccharide polyethers to obtain flame-retardant, charcoated urethane foams, the phosphorus in the foamed product being present either as a coreactant or a physical additive.

Other objects, features, and advantages of the invention will be more apparent from the following description thereof.

The polyethers which have been found to be useful in the practice of the invention are from the class of alkoxylated disaccharides including ethoxylated disaccharides, propoxylated disaccharides, butoxylated disaccharides, etc. These alkoxylated disaccharides are produced from the following disaccharides: sucrose, lactose; maltose; trehalose; cellobiose; gentiobiose and melibiose. As stated above, the disaccharide must have an average of substantially one to two alkoxides, such as propoxide, reacted per hydroxyl. A value very much below one yields a disaccharide polyether impractical for use in making a useful polyurethane foam. A disaccharide containing an average of substantially more than two reacted alkoxides per hydroxyl can be used to prepare a foam. However, the concentration of disaccharide per se in the foam will be too low to give the type of burning which has been found to be characteristic of urethane foams of the invention containing disaccharides in a certain range.

The phosphorus-containing compounds which have been found to be efficacious are those which preferably contain a minimum of 7–10% phosphorus by weight. As has been indicated above, these phosphorus-containing compounds can be categorized as either coreactants, i.e. they become a part of the molecular structure of the foam, or as physical additives. In addition to the requirement that they preferably contain a minimum of 7–10% phosphorus, a phosphorus compound which is a coreactant must also have at least two reactive hydrogen atoms per molecule. For example, products of an acid of phosphorus and an alkylene oxide are most useful as coreactants for the purpose of the invention.

Non-limiting examples of phosphorus organic chemical compounds are those which may be selected from the following classes as long as those selected contain a minimum of 7–10% by weight of phosphorus.

I. Compounds containing 2 active hydrogen atoms per molecule:

(a) Monoesters of phosphoric acid

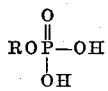

(b) Diesters of pyrophosphoric acid

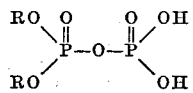

or

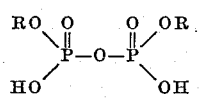

(c) Diesters of diphosphoric acid

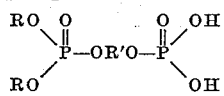

or

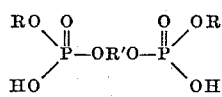

(d) Diesters of diphosphonic acid

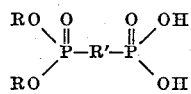

or

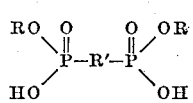

(e) The reaction product of any one of (a) through (d) with an alkylene oxide wherein the oxygen atom is attached to adjacent carbon atoms.

II. Compounds containing more than 2 active hydrogen atoms per molecule:

(a) Monoesters of pyrophosphoric acid

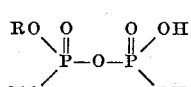

of diphosphonic acid

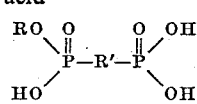

and diphosphoric acid

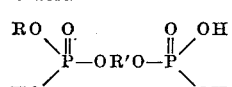

(b) The reaction of compounds of (a) with an alkylene oxide wherein the oxygen atom is attached to adjacent carbon atoms.

The invention will also include the reaction products of other phosphorus acid esters, such as esters of diphosphinic and phosphonic acids, with an alkylene oxide.

In the above formulae R is an alkyl or aryl radical, substituted or unsubstituted, including methyl, ethyl, butyl, pentyl, hexyl, octyl, dodecyl, phenyl, tolyl, chlorophenyl, octylphenyl, and others well-known to the art. R′ is an alkylene or arylene radical or a series of alkylene or arylene radicals which may be separated by heteroatoms such as O, N and S. It is to be understood that any phosphorus compound containing at least two active hydrogen atoms per molecule will fall within the scope of this invention. Examples of types not shown above which will fall within the scope of this invention are

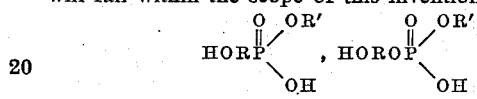

and their alkylene oxide products. R and R′ have the same meaning as R above. Included among the alkylene oxides are ethylene oxide, propylene oxide, butylene oxide, dicyclopentadiene dioxide, 1,4-butadiene dioxide, and others.

Of the compounds listed above, among the preferred organic phosphorus compounds having at least two active hydrogen atoms per molecule and a preferable minimum of 7–10% phosphorus by weight are included the reaction products of alkylene oxides with phosphoric acid or with a dialkyl pyrophosphoric acid, such as dibutyl pyrophosphoric acid.

The basic process for forming polyurethanes and polyurethane foam wherein the products have fire-retardant properties, which comprises replacing all or part of the polyol reactant with an organic phosphorus compound having at least 2 active hydrogen atoms per molecule and reacting the phosphorus compound and any remaining polyol with a polyisocyanate is described in a co-pending application of Charles L. Harowitz, S.N. 807,328, filed April 20, 1959. When the phosphorus compound is the reaction product of an acid of phosphorus having more than two hydroxyl groups per molecule and an alkylene oxide wherein the oxygen atom is attached to adjacent carbon atoms, then from 30 to 100% of the polyol needed to react with the polyisocyanate to form the polyurethane, based upon active hydrogen equivalents, may be replaced by such a reaction product, as disclosed in the aforesaid application. Likewise, when the acid of phosphorus which is reacted with the aforesaid alkylene oxide has two hydroxyl groups, then from 5 to 70% of the polyol needed to react with the polyisocyanate may be replaced by this reaction product, based upon active hydrogen equivalents.

The physical additives which may be used in practicing this invention are neutral aliphatic or aromatic esters of acids of phosphorus. They may contain all aliphatic groups, all aromatic groups, or a mixture of the two; and the aliphatic or aromatic groups may be substituted with other groups such as halogen. The compound will contain the minimum phosphorus content as mentioned above for coreactants. Non-limiting examples of physical additives which have been used are: Tributyl phosphate, tris-(2-chloroethyl) phosphate, tricresyl phosphate, triphenyl phosphate, butyl dibutylphosphinate, diethyl 2-ethylhexylphosphonate, butyl diphenyl phosphate, dimethyl methylphosphonate, tris(2-chloroethyl) phosphite and tris (2,3-dichloropropyl) phosphate. Others are well-known to the art.

All of these phosphorus compounds, both the coreactants and the physical additives, give a flame-retarded, charcoated urethane foam when used in the herein disclosed ranges.

Of the physical additives outlined, among the preferred are tris(2-chloroethyl) phosphate and butyl diphenyl phosphate.

In practicing the invention, it has been found that certain critical limitations govern the charcoating and flame-retardant characteristics of the polyurethane foams made by using the aforesaid disaccharide polyethers. In its preferred form, there must be present in the completed foam a minimum of about 20% and a maximum of about 40% by weight of the alkoxylated disaccharide, such as the propoxylated disaccharide. The better foams are obtained when the alkoxylated disaccharide is between the range of about 25 to 35% by weight, with the best foam obtained when the range is from 30 to 35% by weight. Expressed another way (one which allows a broader interpretation of the limits and one which is actually more descriptive of the limits), the minimum, calculated as total disaccharide in the foam, is about 9% and the maximum about 18% by weight. The minimum-maximum for the better foams will be about 10 to 15% by weight of disaccharide and the best foams will contain about 12–14% disaccharide by weight. Additionally, the foam must contain a phosphorus compound which will give a calculated phosphorus content in the final foam of from about 0.7 to about 4.0% by weight and, preferably, from about 1.5 to 2.5% by weight. This range of phosphorus must be maintained regardless of the manner in which phosphorus is introduced, whether coreacted with or physically added to the polyurethane foam.

A better understanding of the ranges of concentrations using the coreactant approach will be obtained from the following data. Tests 1–6 show foams prepared by varying the amounts of a propoxylated disaccharide (containing only one propoxide per hydroxyl) and a phosphorus-containing compound (propoxylated phosphoric acid). Tests 7–12 are essentially the same as 1–6 except that the phosphorus-containing compound is propoxylated dibutyl pyrophosphoric acid. Test 13 shows a foam made in the same way as those in tests 7–12 except that the disaccharide contained more than one propoxide per hydroxide, i.e. 1.6 propoxyl groups per hydroxyl.

a conventional polyether polyol, namely propoxylated sorbitol containing about one propoxide per hydroxyl.

TABLE II

| Test No. | Percent Propoxylated Disaccharide in Foam | Percent Conventional Polyol in Foam | Percent Disaccharide in Foam | Phosphorus Cmpd. | | Charcoat | Self-Exting.[1] | Wet Burn |
| --- | --- | --- | --- | --- | --- | --- | --- | --- |
| | | | | Percent Cmpd. by Wt. of Foam | Percent P by Wt. of Foam | | | |
| 14 | 22 | 9 | 9.2 | 20 | 2.26 | Yes | Good | No. |

[1] Match Test.

These tests show several important points. Even though flame retardant, charcoated foams are obtained within the stated ranges of propoxylated disaccharide and phosphorus, certain phosphorus compounds do not extend over the whole range. Test No. 6 shows that 2.15% of phosphorus gives excellent self-extinguishing properties, but no charcoat. However, see tests 10 and 11, wherein a higher amount of phosphorus is used to give a foam having both flame retardant and charring properties. They also show that phosphorus *must* be present in the foam if this combination of properties is to be obtained. Test 1 shows that a foam neither burns with a charcoat nor is self-extinguishing when phosphorus is absent. Even as little as 0.67% phosphorus in the foam (test 2) will give a charcoat and some flame-retardancy. This leads to the conclusion that perhaps phosphorus outside (below) the range stated will give charcoat, but no flame-retardancy. The data further tend to support the facts (1) that phosphorus must be present to give the charcoating effect and (2) that the concentrations of phosphorus and propoxylated disaccharide must be balanced to give the two desired properties.

Test No. 14 supports the broader method of expressing the concentration of propoxylated disaccharide in the foam in terms of the disaccharide per se. The test shows that, regardless of any other polyether polyols present, the foam will form a charcoat and be self-extinguishing as long as the minimum disaccharide and phosphorus are present in the polyurethane foam.

For general methods of preparing the above test foams, using only minor variations for any given foam, see Example III, infra, for test 1; Example I, infra, for tests 2–12; and Example II for test 13. The disaccharide used was sucrose.

Additionally, the following table gives a better understanding of the ranges of additive phosphorus compounds. All the test foams were prepared according to

TABLE I

| Test No. | Percent Propoxylated Disaccharide in Foam | Percent Disaccharide in Foam | Phosphorus Comp. | | Charcoat | Self-Exting.[1] | Wet Burn |
| --- | --- | --- | --- | --- | --- | --- | --- |
| | | | Percent Cmpd. by Wt. of Foam | Percent P by Wt. of Foam | | | |
| 1 | 45.5 | 19.1 | 0 | 0.0 | No | No | Yes. |
| 2 | 39 | 16 | 10 | 0.67 | Yes | Borderline | No. |
| 3 | 34 | 14 | 15 | 0.95 | Yes | Barely | No. |
| 4 | 30 | 13 | 20 | 1.38 | Yes | Fair | No. |
| 5 | 26 | 11 | 26 | 1.76 | Mostly | Good | Some. |
| 6 | 21 | 8.4 | 31 | 2.15 | No | Excell | Yes. |
| 7 | 41 | 17 | 6 | 0.70 | Yes | Barely | No. |
| 8 | 37.5 | 16 | 10 | 1.16 | Yes | Good | No. |
| 9 | 34 | 14.3 | 15 | 1.7 | Yes | Good | No. |
| 10 | 30 | 12.5 | 20 | 2.26 | Yes | Excell | No. |
| 11 | 27.4 | 11.4 | 25 | 2.90 | Yes | Excell | No. |
| 12 | 23.2 | 9.7 | 31 | 3.60 | Mostly | Excell | No. |
| 13 | 37 | 11.6 | 19 | 2.2 | Yes | Excell | No. |

[1] Match Test.

Test 14 is the same as tests 7–12 except that the propoxylated disaccharide was used in combination with Example IV, infra, wherein the only polyol used was propoxylated sucrose.

TABLE III

| Test No. | Compound | Percent Propoxylated Sucrose in Foam | Percent Sucrose in Foam | Phosphorus Cmpd. Percent Cmpd. by Wt. of Foam | Phosphorus Cmpd. Percent P by Wt. of Foam | Charcoat | Self-Exting.[1] | Wet Burn |
|---|---|---|---|---|---|---|---|---|
| 1 | $(C_4H_9O)_3PO$ | 43.0 | 18 | 6 | 0.70 | Yes | Barley | No. |
| 2 | $(C_4H_9O)_3PO$ | 40.0 | 17 | 10 | 1.16 | Yes | Good | No. |
| 3 | $(C_4H_9O)_3PO$ | 38.0 | 16 | 15 | 1.74 | Yes | Excell | No. |
| 4 | $(C_4H_9O)_3PO$ | 32.3 | 13.6 | 25 | 2.90 | Yes | Excell | No. |
| 5 | $(ClCH_2CH_2O)_3PO$ | 43.0 | 18 | 6 | .65 | Yes | Barley | No. |
| 6 | $(ClCH_2CH_2O)_3PO$ | 40.0 | 17 | 10 | 1.08 | Yes | Excell | No. |
| 7 | $(ClCH_2CH_2O)_3PO$ | 32.3 | 13.6 | 25 | 2.72 | Yes | Excell | No. |
| 8 | $(ClCH_2CH_2O)_3PO$ | 29.8 | 12.4 | 30 | 3.27 | Yes | Excell | No. |
| 9 | $(ClCH_2CH_2O)_3PO$ | 27.0 | 11.3 | 35 | 3.82 | Mostly | Excell | Some. |
| 10 | $C_4H_9O\overset{O}{\underset{\|}{P}}(C_4H_9)_2$ | 37.6 | 15.8 | 15 | 1.98 | Yes | Excell | No. |
| 11 | $(C_2H_5O)_2\overset{O}{\underset{\|}{P}}C_8H_{17}$[2] | 35.0 | 14.7 | 20 | 2.48 | Yes | Excell | No. |
| 12 | $(C_6H_5O)_2\overset{O}{\underset{\|}{P}}OC_4H_9$ | 35.0 | 14.7 | 20 | 2.02 | Yes | Excell | No. |
| 13 | $(CH_3C_6H_4O)_3PO$ | 35.0 | 14.7 | 20 | 1.66 | Yes | Excell | No. |
| 14 | $(CH_3O)_2\overset{O}{\underset{\|}{P}}CH_3$ | 43.1 | 18.1 | 4.47 | 1.12 | Yes | Excell | No. |

[1] Match Test (Discussed infra).
[2] 2-ethylhexyl=$C_8H_{17}$.

The above tables show that regardless of how the phosphorus is put into the urethane foam, it will be flame-retardant and charcoated if the percents of alkoxylated disaccharide and phosphorus are within the ranges shown here and disclosed elsewhere in this specification.

Further, it is unnecessary to put all of the phosphorus in the foam by only one of these two methods. It has been discovered that a combination of these two methods may be used to give the desired foam properties if the amount of phosphorus by weight in the finished product is within the specified range.

As was mentioned above, conventional polyethers drip or fail to form charcoats when they burn. As is adequately shown in the tables above, when foams are prepared by the reaction of disaccharide polyethers and polyisocyanates, with the finished foam having therein a calculated disaccharide content of about 9–18% by weight of the foam and having included therein from about 0.7 to about 4.0% phosphorus by weight of the foam, they form even charcoats over the whole of the burned area. In addition to the charcoat, the flame characteristics of the foams produced according to the invention are vastly improved. There is always a significant reduction in burning time when using phosphorus within the stated ranges, and in the preferred systems, the foam is self-extinguishing under the conditions of standard flame tests.

There is no doubt that reduced burning time and self-extinguishing properties are due to the phosphorus present in the foam. While it is not desired to restrict or limit the invention by any explanation of why the foams made with the disaccharide polyethers form charcoats, it is believed that this is due to the presence in the finished foam of the disaccharide itself, even though the foam's ability to form a charcoat requires what might be called a catalyst effect of the phosphorus. If, as appears, the charring characteristic of the foam is due to the disaccharide present therein and to the catalytic effect of the phosphorus, the critical concentration of disaccharide is understandable. Sucrose itself will char when it is burned. However, it was certainly unobvious that this or any other disaccharide would provide the even charcoating obtained by its combination with polyisocyanates and compounds of phosphorus. This is especially true when it is considered that polyurethane foams containing disaccharides do not give charcoats in the absence of a phosphorus compound.

The stoichiometric relationship between the reactive centers of the propoxylated disaccharide and the coreactive phosphorus compound on the one hand and the reactive centers of the polyisocyanate on the other is very important. When part of the disaccharide polyether is replaced by a phosphorus compound containing at least two active hydrogen atoms per molecule, the same number of reactive centers in the mixture must be maintained as closely as possible to that of the undiluted disaccharide polyether in order to obtain optimum foam properties. The balance can be maintained by substituting a quantity of phosphorus compound on the basis of hydrogen equivalents, not of weight. This means that for every disaccharide hydroxyl deleted, substantially one hydroxyl must be contributed from the phosphorus compound used as the coreactant. It must be understood that a flame-retardant foam can be obtained if about 80–145% of theoretical hydroxyl to isocyanate is used. Normally the best foams are produced at 90–100% of theory.

The primary considerations in balancing the reactive polyol mixture are those which have been discussed above, i.e., the phosphorus must be from about 0.7 to about 4.0% of the weight of the completed foam and the propoxylated disaccharide, calculated as the disaccharide, must be between about 9 and 18% of the total weight of the foam. Once a foam within these limits has been decided upon, it is a relatively simple matter to adjust the concentrations of the reactants to the correct proportions.

The preparation of a flame-retardant foam from the disaccharide polyethers, polyisocyanates and the neutral phosphorus compounds outlined above is simpler due to the fact that only the non-phosphatic polyol is used. The only balance to be achieved is that between the reactive centers of the polyisocyanate and the polyol in order to obtain optimum foam properties. The neutral phosphorus compound is merely added, this time by weight, to the reactants. As in the coreactive approach, however, the balance of phosphorus and calculated disaccharide must be maintained if a flame-retardant, non-dripping, even charcoated foam is to be produced.

The invention has been discussed on the basis of 9–18% of disaccharide in the completed foam. This discussion was predicated on the preferred phosphorus compounds, all of which contain at least the stated 7–10% minimum of phosphorus. However, it is intended that this invention will cover a deviation above the stated maximum of 18% disaccharide, provided that the phosphorus concentration is within the stated range. The reason is obvious. As the disaccharide content increases, it becomes impossible to maintain the desired range of phosphorus in the foam by placing therein a phosphorus compound having 7–10% of phosphorus. As the tables show, there is a point at which the flame-retardancy characteristic is lost or seriously impaired when less than the stated amount is present.

As the percent of phosphorus in a compound increases from 10%, however, it will become possible to use more disaccharide, and still maintain the desired range of phosphorus. This is true because even though the disaccharide content is increased, it will be possible to use a smaller weight of a compound containing, say, 30% phosphorus and still maintain a range of 0.7–4.0% of phosphorus in the foam. One example of a compound containing about 30% phosphorus and falling within the definition set forth herein is methyl dimethylphosphonite [(CH$_3$)$_2$POCH$_3$].

Aside from the discovery of how to form flame-retardant, non-dripping, charcoated foams from the disclosed disaccharide polyethers, the discovery of how to make foams from some of these polyethers at all is important. The disaccharides containing only one propoxyl group per hydroxyl (those prepared by the special process of U.S. Patent No. 2,927,918) are so viscous that they are more nearly solid than liquid at ambient temperatures. It is not impossible, but it is manifestly impractical to prepare foams by reacting them with diisocyanates. Since they are heat-responsive, the viscosity can be lowered by applying heat. They can be used in the heated state to produce a foam, but it is difficult to work with the hot system since the foaming action begins immediately. This leads to poor foams due, for one thing, to incomplete mixing. Therefore, the diluent and coreactive phosphorus compounds of the present invention make handling and processing of the viscous disaccharides easier.

The alkoxylated disaccharides and phosphorus compounds useful in the practice of the invention can be prepared by known methods or combinations of methods. Propoxylated dibutyl pyrophosphoric acid, for example, can be prepared by reacting substantially 2 moles of butyl alcohol with substantially one mole of phosphorus pentoxide, reacting the product thus obtained with an excess of propylene oxide and removing excess oxide under reduced pressure.

This invention can be further illustrated with the following specific examples. It must be understood, however, that they are illustrative only and the invention is not to be considered limited thereby. In all of the examples, the parts are by weight unless otherwise specified.

*Example I*

RIGID FOAM PREPARED FROM TOLYLENE DIISOCYANATE, PROPOXYLATED SUCROSE CONTAINING ONE PROPOXYL GROUP PER HYDROXYL, AND PROPOXYLATED DIBUTYL PYROPHOSPHORIC ACID (FREON BLOWN)

A resin was prepared by mixing 60 parts of octakis-(2-hydroxypropyl) sucrose with 40 parts of propoxylated dibutyl pyrophosphoric acid. The resin thus prepared contained an approximate OH number of 425.

A semi-prepolymer was prepared by adding 22 parts of the above resin to 78 parts of tolylene diisocyanate, allowing free exotherm to 90° C. and holding the temperature at 90–100° C. for one hour. The semi-prepolymer was stabilized by adding 0.1 part of benzoyl chloride per 100 parts of semi-prepolymer.

To 96 parts of the resin prepared above were added 32 parts of trichloromonofluoromethane (Freon 11) and 0.75 part of triethylenediamine having the formula

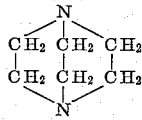

100 parts of the above semi-prepolymer containing 1.0 part of a silicone-type surfactant was added to the vigorously stirred resin mixture. When the foaming action was proceeding, the stirrer was removed and the foaming mixture was poured into a container where the foaming action was completed. The foam thus obtained contained about 13% sucrose by weight and about 2.3% phosphorus by weight, and was comparable in all its properties (except its burning characteristics) to foams made with conventional polyethers. Foaming and curing were allowed to take place at room temperature, and the foam stood for 24 hours before testing.

*Example II*

RIGID FOAM PREPARED FROM TOLYLENE DIISOCYANATE, PROPOXYLATED SUCROSE CONTAINING ABOUT 1.6 PROPOXYL GROUPS PER HYDROXYL, AND PROPOXYLATED DIBUTYL PYROPHOSPHORIC ACID (FREON BLOWN)

A semi-prepolymer was prepared by adding 36 parts of propoxylated dibutyl pyrophosphoric acid to 64 parts of tolylene diisocyanate, allowing free exotherm to 90° C. and holding the temperature at 90–100° C. for one hour. The semi-prepolymer contained about 25% free NCO.

To 154 parts of propoxylated sucrose containing about 1.6 propoxides per hydroxyl were added 60 parts of Freon and 2 parts of tetramethylbutanediamine. 200 parts of the above semi-prepolymer containing 2 parts of the silicone-type surfactant used in Example I were added to the vigorously stirred mixture of propoxylated sucrose, Freon and amine. Foaming and curing were at room temperature, with 24 hours elapsing before any testing.

*Example III*

RIGID FOAM FROM PROPOXYLATED SUCROSE (1 OXIDE/OH) AND TOLYLENE DIISOCYANATE (FREON BLOWN)

A semi-prepolymer was prepared by adding 20.3 parts of octakis(2-hydroxypropyl) sucrose and 79.7 parts of tolylene diisocyanate under the same semi-prepolymer temperature conditions as in I and II above. 0.1 part of benzoyl chloride per 100 parts of semi-prepolymer was used to stabilize the product.

143 parts of the propoxylated sucrose was heated to 60° C. This was added to a mixture of 200 parts of the above semi-prepolymer (containing about 30% free NCO) and 2 parts of the silicone-type surfactant of Example I, and blended. 57 parts of Freon were added to the mixture, and after this was blended, 1.5 parts of triethylenediamine were added. Vigorous mixing was maintained as long as possible, i.e. until the mixture began to foam. The foaming mixture was poured into a container where the foaming action was completed. It was allowed to stand 24 hours at room temperature.

*Example IV*

RIGID FOAM PREPARED FROM PROPOXYLATED SUCROSE (1 OXIDE/OH), TOLYLENE DIISOCYANATE AND PHYSICALLY ADDED BUTYL DIPHENYL PHOSPHATE (FREON BLOWN)

The semi-prepolymer was prepared exactly as in Example III.

143 parts of the propoxylated sucrose were heated to 60° C. After blending this with 105 parts of butyl diphenyl phosphate, 2 parts of the above silicone surfactant, 73 parts of Freon and 1.5 parts of triethylenediamine, 200 parts of semi-prepolymer were added. After vigorous mixing, the foaming action began and the entire contents were poured and allowed to foam and cure at room temperature 24 hours before testing.

FLAME TESTING

The flame test used in the above tables is commonly referred to in the art as the match test.

To perform the match test, a block of foam approximately 3 in. x 3 in. x 1 in. is cut and is stood on one of its edges. A lighted match is held against the longer side, contacting the foam sample in the top one-third portion thereof. It is held there for several seconds and the type of burning is observed (melting, dripping or charcoating). The flame is then removed in order to observe the self-extinguishing properties.

Test samples of foams made by Examples I, II, and IV were all self-extinguishing and evenly charcoated under the conditions of the match test. A test sample of the foam made by Example III was neither flame-retardant nor charcoated.

In addition, the following data were obtained on a foam sample from Example I.

ASTM D1692–59T:
  Burning time (secs.)[1] _____ 33.
  Total distance burned (ins.) _____ 15/16.
Underwriters' (60 sec. ign.):
  Self-extinguishing time (secs.)[2] _____ 33.
  Total distance burned (ins.) _____ 15/16.
Military candle test _____ Passes.

[1] Flame never reached 1″ mark. Foam was self-extinguishing in the time shown with burner in place. The foam was evenly charcoated.
[2] Burner still in place when foam was self-extinguished. The foam was evenly charcoated.

It is not believed necessary to enumerate any long list of polyisocyanates which will react with the alkoxylated disaccharides in the presence of the coreactant phosphorus-containing compound or the phosphorus-containing compound which is merely a physical additive, since these polyisocyanates are well-known in the art. While the best results have been obtained with the alkoxylated sucrose, sucrose being a non-reducing sugar, good polyurethane foams are obtained by using other non-reducing saccharides, such as alkyl glucosides and particularly methyl glucoside.

The silicone-type surfactants used in the foregoing Examples I–IV and in making other foams include the dimethyl siloxane glycol copolymers having the following formula

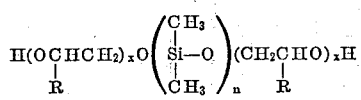

These copolymers are available from the Dow-Corning Company under the trademark DC–199 and also available from Union Carbide Corporation under trademarks L–520 and L–521. Other types of surfactants useful in the preparation of polyurethane foams are well known in the art and can be used in place of the above. Included among these other silicone surfactants is one having the following formula

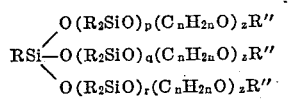

wherein R and R″ are methyl groups, R′ is an ethyl group, $p$, $q$, and $r$ have an average value of 3, the $(C_nH_{2n}O)_z$ unit represents a polyoxyethylene block containing an average of 16 oxyethylene units, wherein $z$ is equal to 16 and $n$ is equal to 2. It is sold by the Dow-Corning Company under the trademark DC–200.

In this disclosure, the expression "alkoxylated disaccharide having an average of from one to two alkoxides reacted per hydroxyl" (and similar expressions) means that the total number of alkoxides reacted with the disaccharide divided by the number of hydroxyls in the disaccharide equals a number of from about one to about two. For example, in the case of sucrose, the above range would require from about 8 to about 16 moles of alkoxide, regardless of the number of alkoxides reacting for any given hydroxyl. In other words, the expression is intended to cover any combination of alkoxide-hydroxyl reactions whose alkoxide/hydroxyl ratio is a number from about one to about two.

Whereas the above disclosure is based on a foam density of substantially 2.0 pounds per cubic ft., it is to be understood that foams having higher or lower densities and whose ingredients do not vary greatly from the approximate ranges specified will come within the scope of this invention.

Having fully described the invention, what is claimed is:

1. A process for producing a flame-retardant polyurethane foam which is non-dripping and forms a non-burning charcoat on its surface when in contact with a flame, consisting essentially of reacting an organic polyisocyanate with a hydroxy terminated alkoxylated disaccharide having an average of from one to two oxyalkylene groups per hydroxyl in the presence of a phosphorus-containing compound, foaming the reaction product in the presence of a foaming agent and curing said product, the amount of said alkoxylated disaccharide being sufficient to produce a total disaccharide content in said product calculated as from about 9% to about 18% by weight of said foamed product, the amount of said phosphorus-containing compound being sufficient to produce a total phosphorus content in said product calculated as from about 0.7% to about 4.0% based on the weight of said product.

2. A process for producing a flame-retardant polyurethane foam which is non-dripping and forms a non-burning charcoat on its surface when in contact with a flame, consisting essentially of reacting an organic polyisocyanate with a hydroxy terminated alkoxylated disaccharide having an average of from one to two oxyalkylene groups per hydroxyl and with a phosphorus-containing compound having at least two active hydrogen atoms per molecule, foaming the reaction product in the presence of a foaming agent and curing said product, the amount of said alkoxylated disaccharide being sufficient to produce a total disaccharide content in said product calculated as from about 9% to about 18% by weight of said foamed product, the amount of said phosphorus-containing compound being sufficient to produce a total phosphorus content in said product calculated as from about 0.7% to about 4.0% based on the weight of said product.

3. A process for producing a flame-retardant polyurethane foam which is non-dripping and forms a non-burning charcoat on its surface when in contact with a flame as defined in claim 2 wherein the amount of the said alkoxylated disaccharide is sufficient to produce a total disaccharide content in said product calculated as from about 10%–15% by weight of said foamed product.

4. A process for producing a flame-retardant polyurethane foam which is non-dripping and forms a non-burning charcoat on its surface when in contact with a flame as defined in claim 2 wherein the said amount of alkoxylated disaccharide is sufficient to produce a total disaccharide content in said product calculated as from about 12%–14% by weight of said foamed product.

5. A process for producing a flame-retardant polyurethane foam which is non-dripping and forms a non-burning charcoat on its surface when in contact with a flame as defined in claim 1 wherein the amount of said phosphorus-containing compound is sufficient to produce a total phosphorus content in said product calculated as from about 1.5% to about 2.5% based on the weight of said product.

6. A process for producing a flame-retardant polyurethane foam which is non-dripping and forms a non-burning charcoat on its surface when in contact with a flame as defined in claim 2 wherein said alkoxylated disaccharide is a member selected from the group consisting of ethoxylated, propoxylated and butoxylated disaccharide selected from the group consisting of sucrose, lactose, maltose, trehalose, cellobiose, gentiobiose and melibiose.

7. A process for producing a flame-retardant polyurethane foam which is non-dripping and forms a non-burning charcoat on its surface when in contact with a flame as defined in claim 6, wherein said alkoxylated disaccharide is propoxylated sucrose.

8. A process for producing a flame-retardant polyurethane foam which is non-dripping and forms a non-burning charcoat on its surface when in contact with a flame as defined in claim 6 wherein said phosphorus-containing compound is the reaction product of an alkylene oxide with phosphoric acid.

9. A process for producing a flame-retardant polyurethane foam which is non-dripping and forms a non-burning charcoat on its surface when in contact with a flame as defined in claim 8 wherein said alkylene oxide is propylene oxide.

10. A process for producing a flame-retardant polyurethane foam which is non-dripping and forms a non-burning charcoat on its surface when in contact with a flame as defined in claim 6 wherein said phosphorus-containing compound is the reaction product of an alkylene oxide with a dialkyl pyrophosphoric acid.

11. A process for producing a flame-retardant polyurethane foam which is non-dripping and forms a non-burning charcoat on its surface when in contact with a flame as defined in claim 10 wherein said phosphorus-containing compound is the reaction product of propylene oxide and dibutyl pyrophosphoric acid.

12. A process for producing a flame-retardant polyurethane foam which is non-dripping and forms a non-burning charcoat on its surface when in contact with a flame, consisting essentially of reacting an organic polyisocyanate with a hydroxy terminated alkoxylated disaccharide having an average of from one to two oxyalkylene groups per hydroxyl, adding to the reaction mixture a phosphorus-containing compound selected from the group consisting of aliphatic esters and aromatic esters of acids of phosphorus, foaming the reaction product in the presence of a foaming agent and curing said product, the amount of said alkoxylated disaccharide being sufficient to produce a total disaccharide content in said product calculated as from about 9% to about 18% by weight of said foamed product, the amount of said phosphorus-containing compound being sufficient to produce a total phosphorus content in said product calculated as from about 0.7% to about 4.0% based on the weight of said product.

13. A process for producing a flame-retardant polyurethane foam which is non-dripping and forms a non-burning charcoat on its surface when in contact with a flame as defined in claim 12 wherein said alkoxylated disaccharide is a member selected from the group consisting of ethoxylated, propoxylated and butoxylated disaccharides selected from the group consisting of sucrose, lactose, maltose, trehalose, cellobiose, gentiobiose and melibiose.

14. A process for producing a flame-retardant polyurethane foam which is non-dripping and forms a non-burning charcoat on its surface when in contact with a flame as defined in claim 13, wherein said alkoxylated disaccharide is propoxylated sucrose.

15. A process for producing a flame-retardant polyurethane foam which is non-dripping and forms a non-burning charcoat on its surface when in contact with a flame as defined in claim 6 wherein said phosphorous-containing compound is tris-(2-chloroethyl) phosphate.

16. A flame-retardant polyurethane foam which is non-dripping and forms a non-burning charcoat on its surface when in contact with a flame, said foam having a total disaccharide content calculated as from about 9% to about 18% by weight of said polyurethane foam and a total phosphorus content calculated as from about 0.7% to about 4% based on the weight of said polyurethane foam.

17. The process as defined in claim 1 wherein said phosphorus-containing compound has at least 7–10% phosphorus by weight of said compound.

References Cited by the Examiner

UNITED STATES PATENTS

| | | | |
|---|---|---|---|
| 2,372,244 | 3/1945 | Adams et al. | 252—49.9 |
| 2,732,367 | 1/1956 | Shokal | 260—67 |
| 2,956,031 | 10/1960 | Khawam | 260—2.5 |
| 2,990,376 | 6/1961 | Bressler et al. | 260—2.5 |
| 3,041,296 | 6/1962 | Lindlaw et al. | 260—2.5 |
| 3,042,666 | 7/1962 | Gentles | 260—2.5 |
| 3,153,002 | 10/1962 | Wismer et al. | 260—2.5 |
| 3,075,928 | 1/1963 | Lanham | 260—2.5 |
| 3,134,742 | 5/1964 | Wismer et al. | 260—2.5 |

OTHER REFERENCES

"The Condensed Chemical Dictionary," 5th ed., copyright 1956, p. 502, Reinhold Pub. Corp., N.Y.

LEON J. BERCOVITZ, *Primary Examiner.*

DANIEL ARNOLD, *Examiner.*

D. ECZAJA, *Assistant Examiner.*